United States Patent [19]

Stewart et al.

[11] Patent Number: 4,787,842

[45] Date of Patent: Nov. 29, 1988

[54] AIR CIRCULATION AND EXHAUST CONTROL SYSTEM FOR COMMERCIAL OVENS

[75] Inventors: G. Wayne Stewart, Plano; Bill E. Davis, Irving; William M. Thomas, Garland; Michael J. Dobie, Plano; Carlos Bacigalupe, The Colony, all of Tex.

[73] Assignee: Stewart Systems, Inc., Plano, Tex.

[21] Appl. No.: 101,841

[22] Filed: Sep. 28, 1987

Related U.S. Application Data

[62] Division of Ser. No. 936,160, Dec. 1, 1986, Pat. No. 4,726,766.

[51] Int. Cl.⁴ .............................................. F23J 5/00
[52] U.S. Cl. .................................... 432/72; 110/162; 110/204; 126/21 A; 432/176
[58] Field of Search ................... 432/72; 110/204, 248, 110/263, 265, 162

[56] References Cited

U.S. PATENT DOCUMENTS

| | | |
|---|---|---|
| 798,345 | 8/1905 | Johnson . |
| 937,000 | 10/1909 | Jacogson . |
| 1,073,126 | 9/1913 | Hitchcock . |
| 1,555,336 | 9/1925 | Vaughan . |
| 1,707,281 | 4/1929 | Sauvage .............................. 110/162 |
| 1,716,460 | 6/1929 | Pointon . |
| 1,790,876 | 2/1931 | Mueller . |
| 1,938,294 | 12/1933 | Lauterbur et al. . |
| 1,949,684 | 3/1934 | Houlis . |
| 2,160,968 | 6/1939 | Hagen ................................. 110/162 |
| 2,202,793 | 5/1940 | Hagen ................................. 110/162 |
| 2,236,085 | 3/1941 | Cook . |
| 2,236,711 | 4/1941 | Kilbury ............................... 432/176 |
| 2,271,091 | 1/1942 | Pecker et al. . |
| 2,289,629 | 7/1942 | Cook . |
| 2,348,950 | 5/1944 | Anderson ............................. 110/162 |
| 2,373,076 | 4/1945 | Engles . |
| 2,674,809 | 4/1954 | Meienhofer . |
| 2,709,412 | 5/1955 | Eagerman . |
| 2,732,627 | 1/1956 | Fava . |
| 2,780,182 | 2/1957 | Rand . |
| 2,961,976 | 11/1960 | Ooms . |
| 3,027,994 | 4/1962 | Lanham et al. . |
| 3,240,316 | 3/1966 | Huffman et al. . |
| 3,249,741 | 5/1966 | Mills . |
| 3,269,142 | 8/1966 | De Mola et al. . |
| 3,310,007 | 3/1967 | Ford . |
| 3,440,973 | 4/1969 | Lanham et al. . |
| 3,478,705 | 11/1969 | Lanham . |
| 3,570,651 | 3/1971 | Lanham et al. . |
| 3,581,679 | 6/1971 | Jansen ................................. 432/72 |
| 3,587,490 | 6/1971 | Martin ................................. 110/162 |
| 3,589,307 | 6/1971 | Lanham et al. . |
| 3,861,334 | 1/1975 | Stockman ............................ 110/204 |
| 4,098,200 | 7/1975 | Dauvergne .......................... 110/204 |
| 4,204,832 | 5/1980 | Miller ................................. 110/162 |
| 4,230,451 | 10/1980 | Chambe ............................... 432/72 |
| 4,244,349 | 1/1981 | Velie et al. .......................... 432/222 |
| 4,262,608 | 4/1981 | Jackson ............................... 110/162 |
| 4,270,467 | 6/1981 | Drake ................................. 432/72 |
| 4,309,171 | 1/1982 | Gentry ................................ 432/163 |
| 4,355,601 | 12/1982 | Hattiangadi ......................... 110/204 |
| 4,402,303 | 9/1983 | Koenneman ......................... 110/162 |
| 4,449,921 | 5/1984 | Catallo ................................ 432/8 |
| 4,483,258 | 11/1984 | John et al. .......................... 110/162 |
| 4,487,137 | 12/1984 | Horvat et al. ....................... 110/162 |
| 4,507,083 | 3/1985 | Fraioli ................................ 432/222 |
| 4,544,352 | 10/1985 | Lanham et al. ..................... 432/133 |
| 4,565,137 | 1/1986 | Wright ................................ 110/265 |
| 4,573,907 | 3/1986 | Coppin et al. ...................... 432/222 |
| 4,591,517 | 5/1986 | Whipple et al. .................... 432/72 |
| 4,608,961 | 9/1986 | Lanham, Jr. et al. ............... 126/21 A |
| 4,631,029 | 12/1986 | Lanham et al. ..................... 126/21 A |
| 4,726,766 | 2/1988 | Stewart et al. ..................... 432/133 |
| 4,730,451 | 10/1980 | Chambe ............................... 432/72 |

FOREIGN PATENT DOCUMENTS 621799 4/1949 United Kingdom .

Primary Examiner—Henry C. Yuen
Attorney, Agent, or Firm—Michael A. O'Neil

[57] ABSTRACT

An oven (20) includes an oven enclosure (24) having a conveyor (40) mounted therein for transporting food products through the oven. A plurality of ribbon burners (100) are mounted within the oven interior (32) adjacent the path of the conveyor to heat the interior of the oven. Heated gases generated by operation of the ribbon burners are received through inlet plenums (140) under operation of a circulation fan (146) and are discharged through discharge tubes (154) extending adjacent portions of the conveyor (40) remote from the locations of the ribbon burners (100). Exhaust gases are removed from the oven interior through discharge ports (180) by exhaust blower assemblies (184) which are operated to remove exhaust gases from the oven interior at a rate proportional to the flow rate of combustion air and gaseous fuel into the ribbon burners.

4 Claims, 8 Drawing Sheets

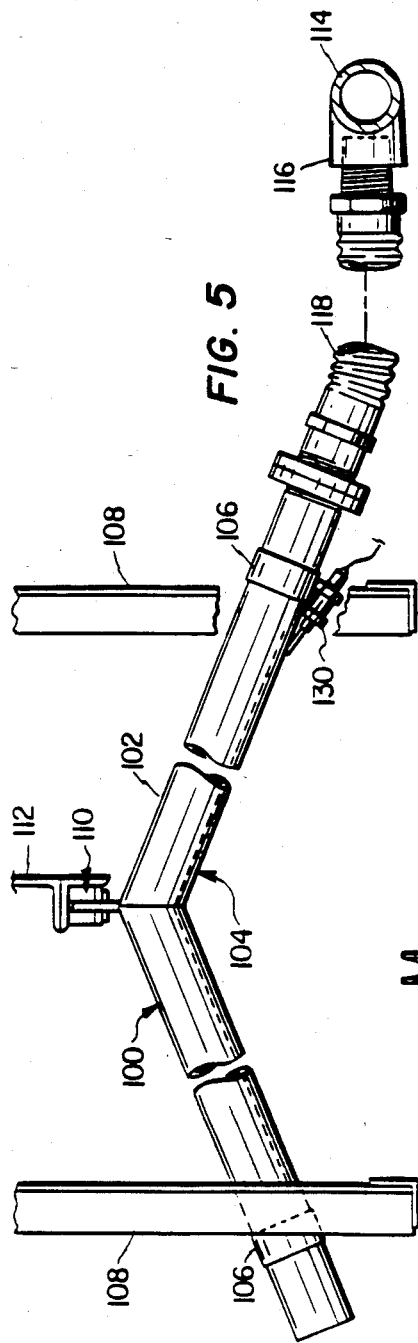
FIG. 5
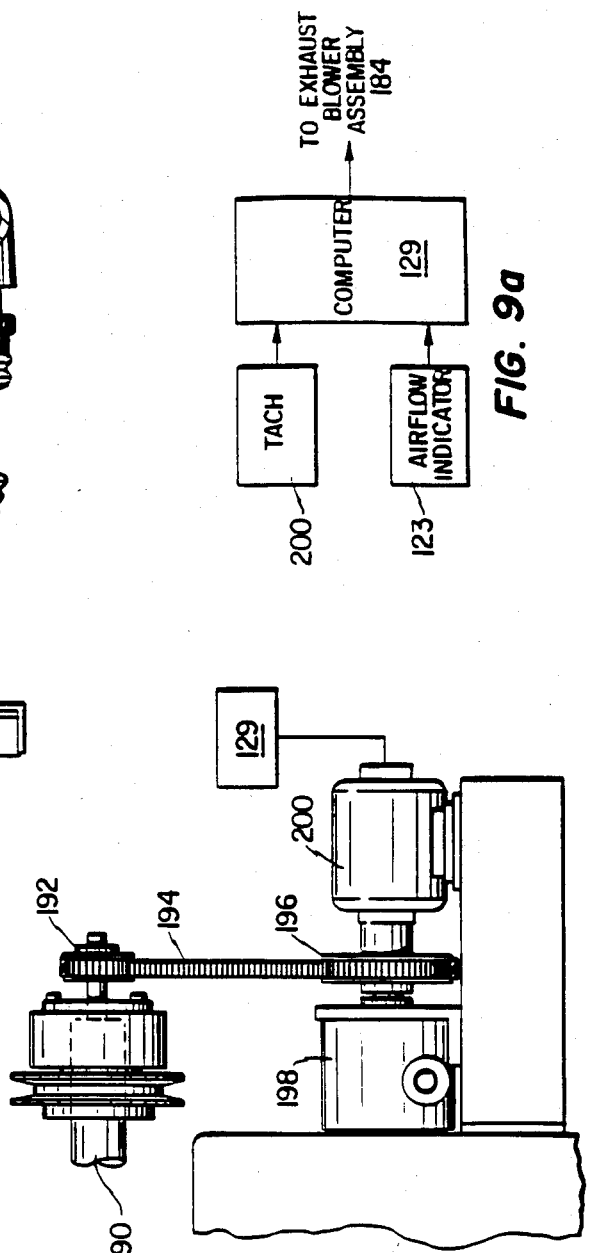
FIG. 9a
FIG. 9

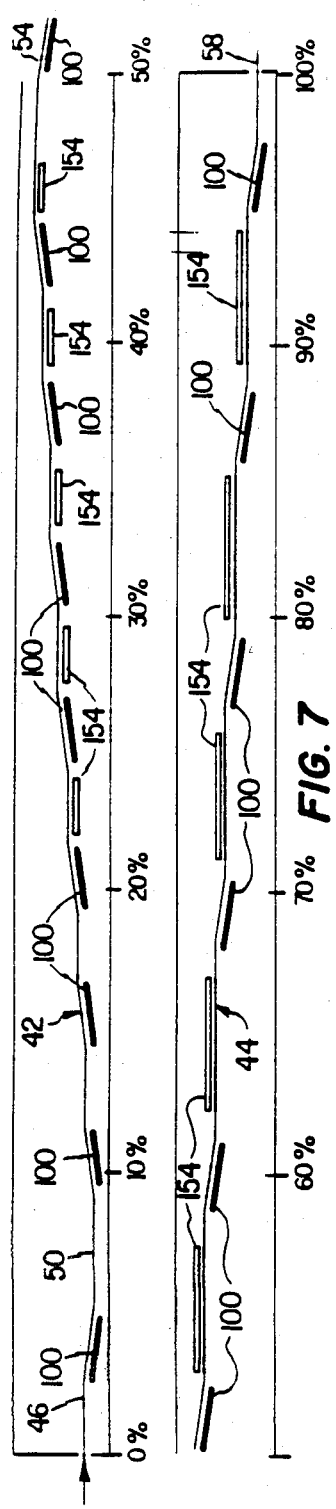
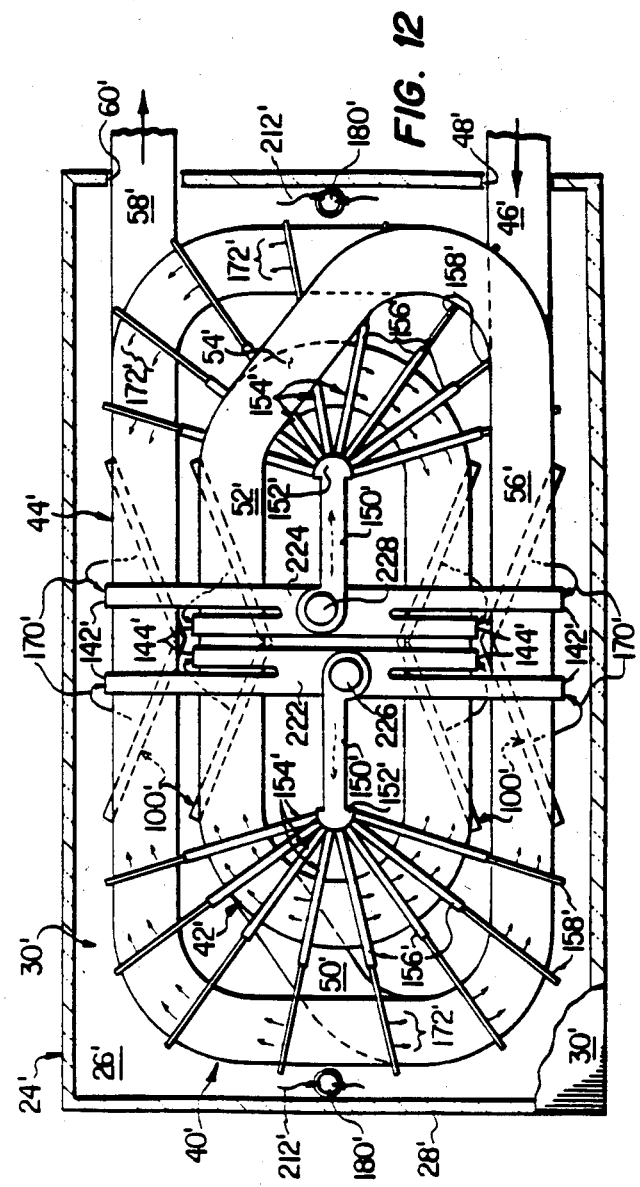
FIG. 7
FIG. 12

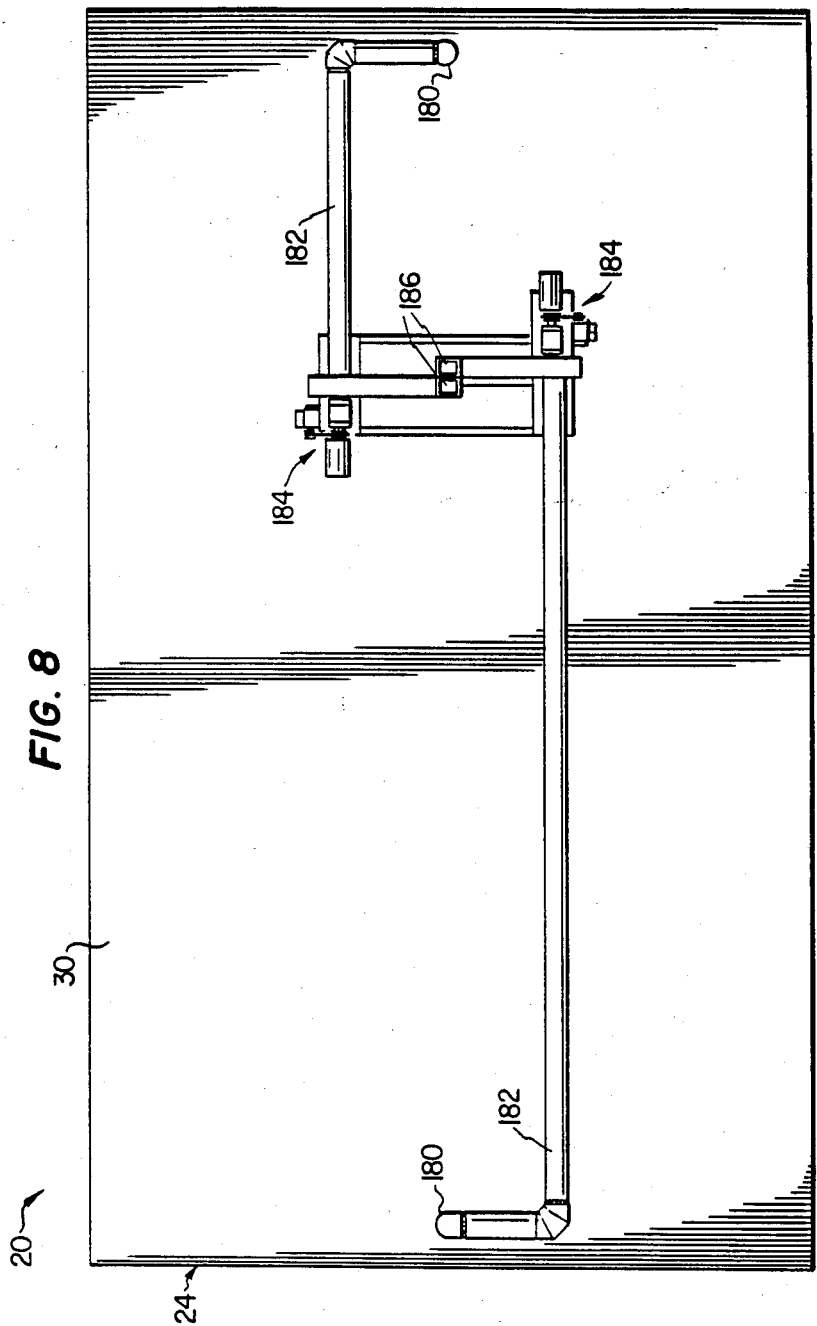

AIR CIRCULATION AND EXHAUST CONTROL SYSTEM FOR COMMERCIAL OVENS

This is a division of application Ser. No. 06/936,160 filed Dec. 1, 1986 U.S. Pat. No. 4,726,766.

TECHNICAL FIELD

This invention relates generally to commercial ovens of the type used in baking bread and similar food products, and more particularly to an air circulation and exhaust control system for commercial ovens.

BACKGROUND AND SUMMARY OF THE INVENTION

Since prehistoric times, ovens have been used in baking bread and similar dough products and in various other types of food preparation activities. A wide variety of oven types have been successfully employed, including open hearth types, deck types, tray types, rack types, and more recently conveyorized ovens. Conveyorized ovens are particularly adapted to modern automated bakeries wherein conveyor systems transport dough receiving pans through the various components of the bakery to produce food products on a continuous basis.

The present invention relates to an air circulation and exhaust control system that is particularly adapted for use in conjunction with conveyorized ovens. In accordance with the broader aspects of the invention, a conveyor transports dough receiving trays through an enclosure defining the oven interior. A plurality of ribbon burners located at predetermined points adjacent the path of the conveyor burn a mixture of natural gas and air to maintain a predetermined elevated temperature within the oven interior. The heated air tends to rise within the oven interior.

An inlet plenum has inlet apertures situated above the ribbon burners. A circulation fan draws the heated air through the inlet apertures and the inlet plenum and discharges the air through outlet passages to outlet plenums. The outlet plenums direct the air to a plurality of discharge tubes situated at predetermined points adjacent the conveyor. Thus, the heated air generated by the ribbon burners is recirculated within the oven interior more effectively to heat the dough contained within the dough receiving pans and to assure that neither "hot spots" nor "cold spots" exist within the oven interior.

The enclosure surrounding the conveyor includes a top panel enclosing the top of the oven interior. An exhaust blower assembly controls the flow of exhaust air out of the oven interior through discharge ports in the top panel. The exhaust blower assembly speed is regulated in accordance with the flow rate of air and gas into the ribbon burners. In this manner, the escape of heated gases from the oven interior is regulated to limit heat loss while simultaneously maintaining the desired atmosphere within the oven interior.

DESCRIPTION OF DRAWINGS

A more complete understanding of the invention may be had by reference to the following Detailed Description when taken in conjunction with the accompanying drawings wherein:

FIG. 5 is a further illustration of the construction and operation of the ribbon burners of the oven of FIG. 1;

FIG. 6 is a transverse sectional view of the oven of FIG. 1 in which certain component parts have been omitted for clarity;

FIG. 7 is a diagramatic illustration of the construction and operation of the oven of FIG. 1:

FIG. 8 is a top view of the oven of FIG. 1;

FIG. 9 is a side view of the oven of FIG. 1 further illustrating certain components of the air circulation and exhaust control system;

FIG. 9A is a schematic view of the control circuitry of the air circulation and exhaust control system;

FIG. 12 is a view similar to FIG. 2 illustrating a second embodiment of the invention.

DETAILED DESCRIPTION

Figure 1:
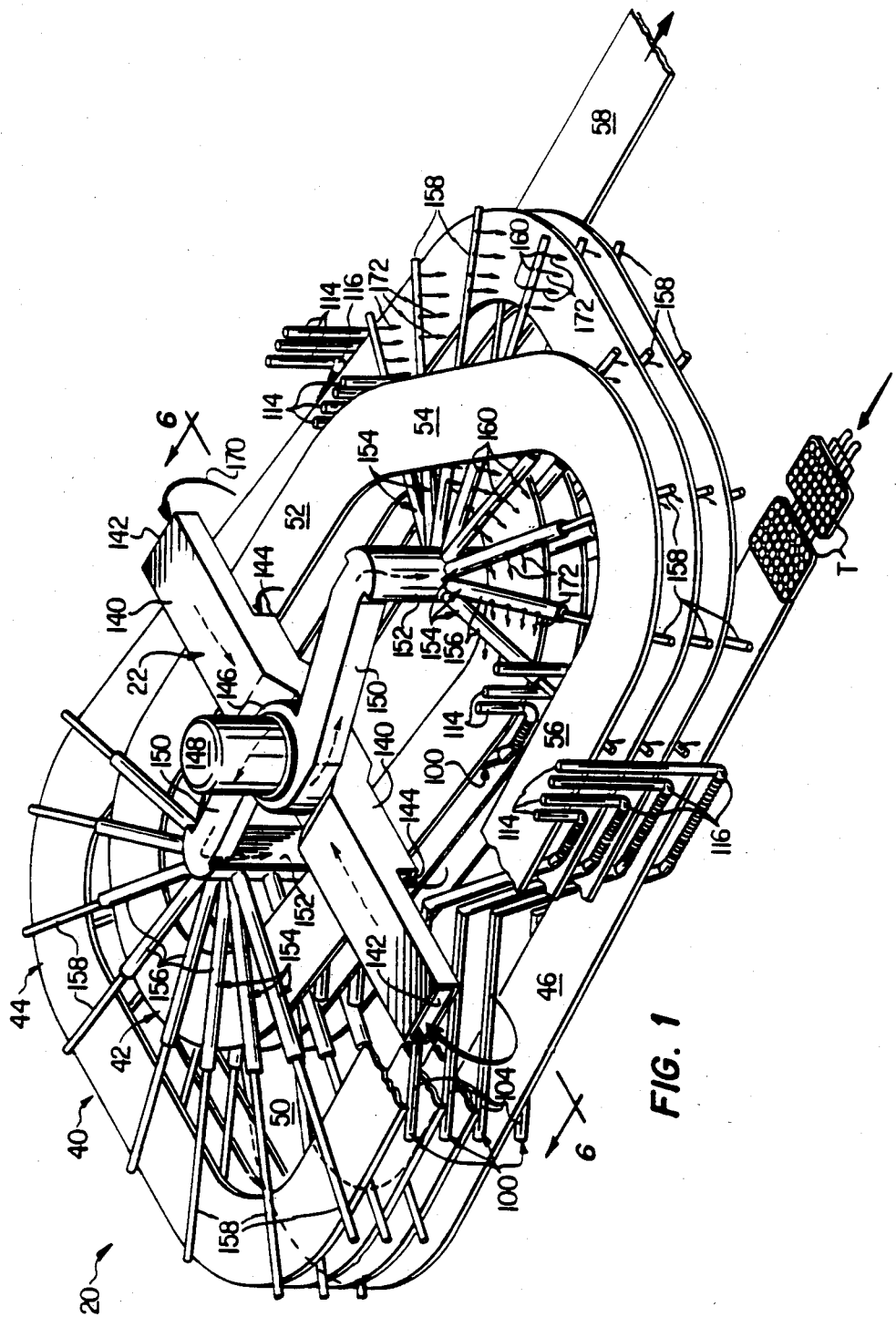
FIG. 1 is a perspective view of an oven having an air circulation and exhaust control system incorporating the present invention in which certain component parts have been omitted and certain other component parts have been broken away more clearly to illustrate certain features of the invention.
Figure 2:
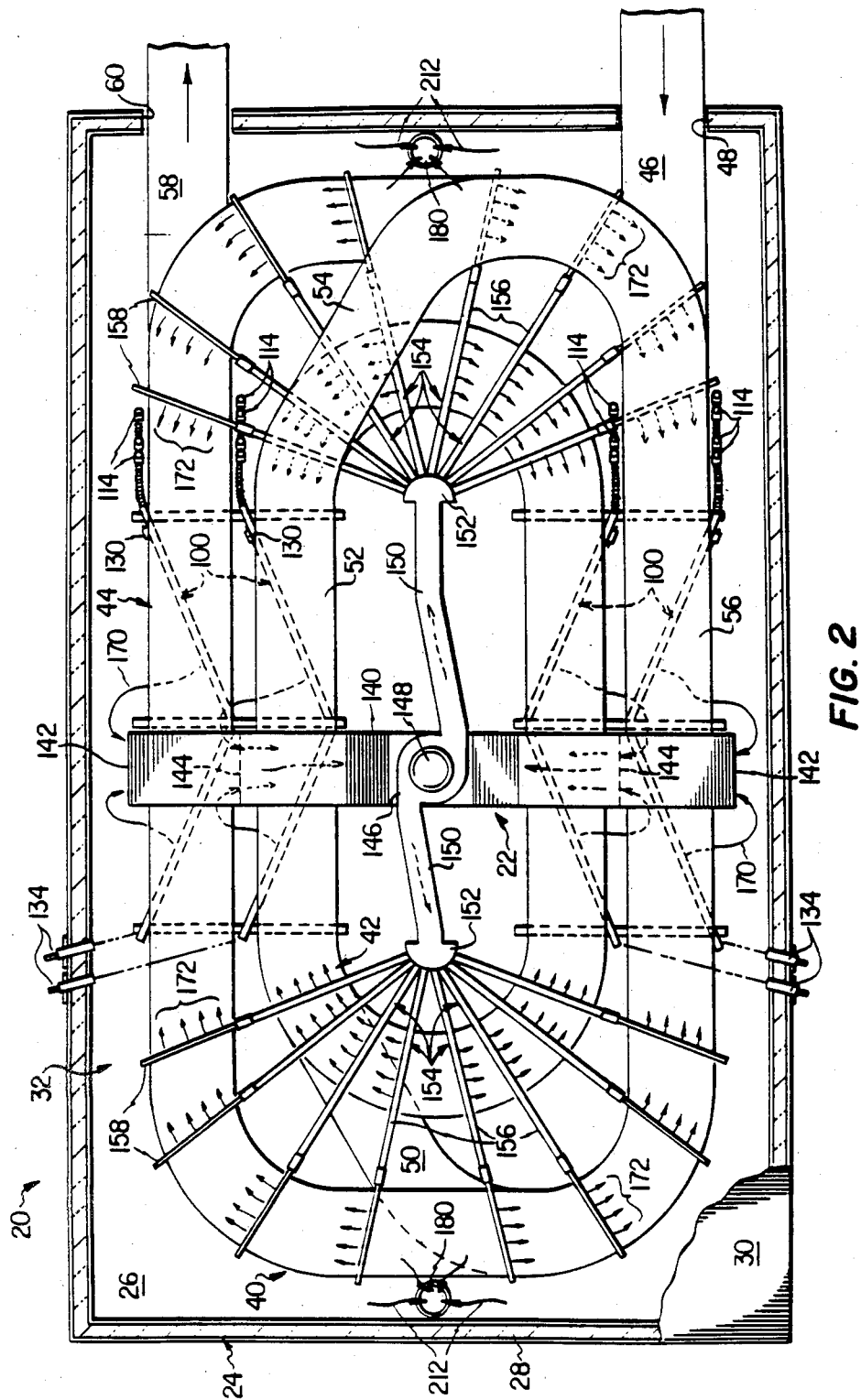
FIG. 2 is a top view of the oven of FIG. 1 in which the top panel of the oven enclosure has been omitted for clarity.

Referring now to the drawings, and particularly to FIGS. 1 and 2 thereof, there is shown an oven 20 incorporating an air circulation and exhaust control system 22 according to the present invention. The oven 20 includes an enclosure 24 comprising a bottom panel or floor 26, side panels or walls 28 and a ceiling or top panel 30. The walls 28 and the top panel 30 preferably are formed of opposed sheet metal panels having a layer of thermally insulating material sandwiched therebetween. The floor 26 may be formed from similar thermally insulated panels, or from concrete or the like. The floor 26, the walls 28, and the top panel 30 define an oven interior 32.

A conveyor 40 is located in the oven interior 32. The conveyor 40 is preferably constructed as illustrated and described in co-pending patent application Ser. No. 880,642, filed June 26, 1986, the disclosure of which is incorporated herein by reference. The conveyor 40 preferably has a generally oval shape with relatively elongated sides and relatively curved ends. While the particular conveyor 40 in the oven 20 is a double spiral conveyor, it will be understood that other conveyor configurations can be used in the practice of the invention.

The conveyor 40 comprises an interior, ascending spiral 42 and an exterior, descending spiral 44. An inlet tier 46 comprising the lowermost tier of one side of the conveyor 40 extends through an inlet door 48 of the enclosure 24. A first transfer portion 50 connects the inlet tier 46 with the interior, ascending spiral 42.

The interior, ascending spiral 42 comprises a plurality of conveyor tiers including an uppermost tier 52. A second transfer portion 54 connects the uppermost tier 52 of the ascending spiral 42 with an upper tier 56 of the exterior, descending spiral 44 of the conveyor 40. The descending spiral 44 comprises a plurality of conveyor tiers, including an outlet tier 58 that forms the lowermost tier of the descending spiral 44. The outlet tier 58 is on the opposite side of the conveyor 40 from the inlet tier 46, and extends outside the enclosure 24 through a door 60.

As will be understood by those skilled in the art, one of the advantages deriving from the use of a double spiral conveyor configuration is that the inlet tier 46 and the outlet tier 58 are situated in the same plane. This greatly facilitates both the construction and the operation of the oven 20. However, the order of ascension and decension, the location of the transfer portions, and the location of the inlet and outlet tiers may be varied in accordance with the requirements of particular applications of the invention.

In the operation of the conveyor 40 of the oven 20, dough receiving trays T are sequentially received on the inlet tier 46. In many instances, the trays T will be received in the oven 20 directly from a proofer wherein dough contained in the trays T has been caused to rise. The dough receiving trays T travel along the inlet tier 46 and across the first transfer portion 50 to the interior, ascending spiral 42 of the conveyor 40. The dough receiving trays T are transported upwardly along each of the tiers of the ascending spiral 42 and ultimately arrive at the uppermost tier 52.

From the uppermost tier 52, the dough receiving trays T move across the second transfer portion 54 to the exterior, descending spiral 44 of the conveyor 40. The food receiving trays T are thereafter transported downwardly, traveling along each of the tiers of the descending spiral 44 to arrive at the outlet tier 58 whereupon the food receiving trays T are transported out of the enclosure 24 of the oven 20.

Figure 3:
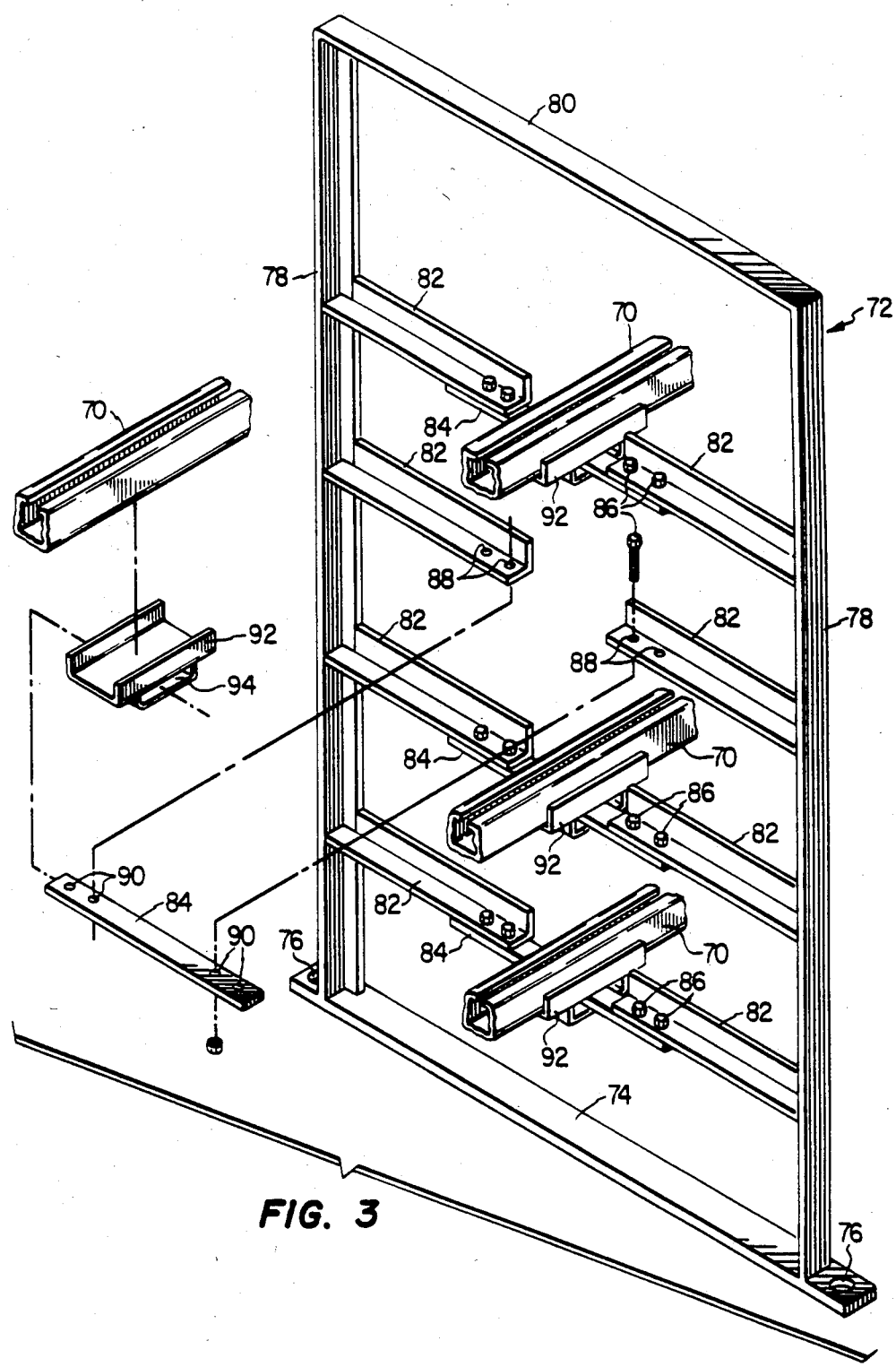
FIG. 3 is an exploded perspective view of one of the conveyor support stands of the oven of FIG. 1.

Referring now to FIG. 3, the conveyor 40 of the oven 20 includes a continuous track 70. The operating components of the conveyor 40 including the track 70 are supported by a plurality of support stands 72 which are preferably formed from a corrosion-resistant material such as stainless steel or "CORTEN" steel. Each support stand 72 includes a bottom plate 74 secured to the floor 26 of the enclosure 24 by suitable fasteners extending through fastener receiving apertures 76. A pair of side plates 78 are secured to and extend upwardly from the bottom plate 74, and a top plate 80 connects the upper ends of the side plates 78.

A plurality of brackets 82 are secured to and extend inwardly from the side plates 78 of the support stand 72. The brackets 82 are arranged in opposed sets. A plate 84 interconnects each set of brackets 82 by means of suitable fasteners 86 extending through fastener receiving holes 88 and 90 formed in the brackets 82 and the plate 84, respectively.

A plurality of track supporting saddles 92 are each ridgedly secured to a portion of the track extending adjacent one of the support stands 72 by welding or by suitable fasteners. Each saddle 92 includes a plate receiving aperture 94 which receives one of the plates 84 interconnecting an opposed set of brackets 82 of the support stand 72. The aperture 94 of each saddle 92 is designed loosely to receive its corresponding plate 84 in the horizontal direction, with the tolerence in the vertical direction being a slide fit. In this manner, the conveyor 40 of the oven 20 is securely supported within the oven interior 32 while simultaneously accommodating thermal expansion and contraction of the component parts of the conveyor 40 and the support stands 72.

Referring now to FIGS. 1, 2, 4, and 5, the oven 20 further includes a plurality of ribbon burners 100. As is best shown in FIG. 5, each ribbon burner 100 comprises a V-shaped length of metal tubing 102 having a slot 104 formed therein from which a mixture of natural gas and air is discharged for combustion. The V-shaped length of metal tubing 102 is supported by a three-point suspension system. A pair of collars 106 supported from frame members 108 loosely receive the tubing 102 to facilitate thermal expansion thereof. A pin and slot connection 110 supports the apex of the V-shaped length of metal tubing 102 from a frame member 112, again accommodating thermal expansion. An inlet manifold 114 extends to an elbow 116. A length of flexible tubing 118 connects the elbow 116 to the V-shaped length of metal tubing 102.

Figure 4:
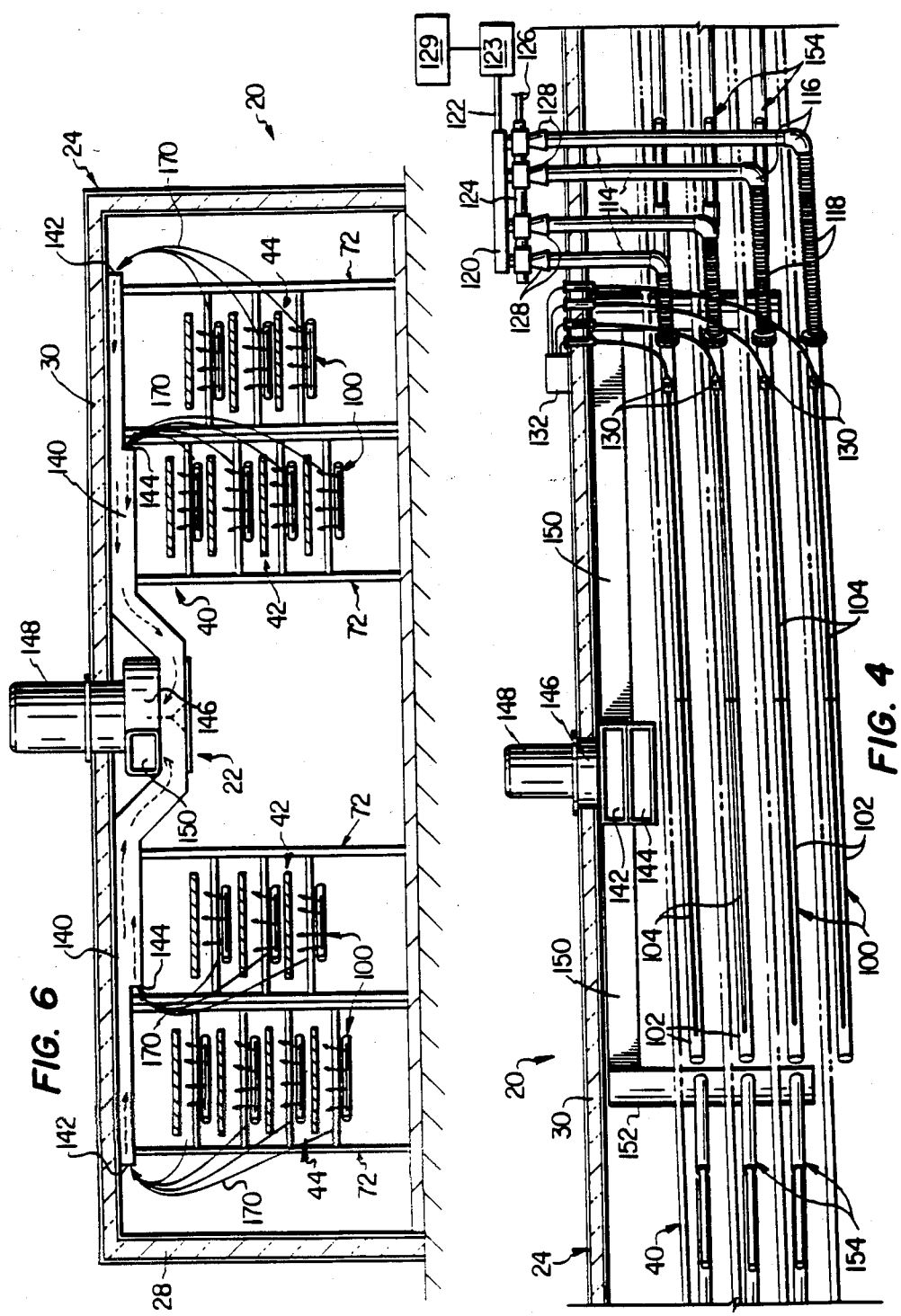
FIG. 4 is a partial side view of the oven of FIG. 1 illustrating the construction and operation of the ribbon burners.

As is best shown in FIG. 4, a supply of combustion air is connected to a manifold 120 through a conduit 122 having an air flow indicator 123 mounted thereon. A supply of gaseous fuel, for example natural gas, butane, propane, etc., is connected to a manifold 124 through a conduit 126. The manifolds 120 and 124 are in turn connected to mixing valves 128 that interconnect the conduits 122 and 126 and the inlet manifolds 114.

The gaseous fuel is provided at a pressure of one atmosphere absolute. Air passing through the mixing valves 128 and the inlet manifolds 114 causes a pressure differential between the flowing air and the gaseous fuel. This pressure differential draws gaseous fuel into the mixing valves 128 and the inlet manifolds 114 thereby receive a combustible mixture from the mixing valves 128 comprising about ten parts combustion air and one part gaseous fuel as determined by the setting of the valves 128. The air flow indicator 123 senses the air flow volume and provides the information to a computer 129.

As is best shown in FIGS. 2, 4 and 5, the combustible mixture flows through the inlet manifolds 114, the flexible tubing 118 and the V-shaped length of metal tubing 102 and is discharged through the slot 104. Each ribbon burner 100 is provided with an ignitor 130 situated at one end of the slot 104. The ignitors 130 comprise spark plugs that are actuated by transformers situated within a housing 132. Upon actuation, the ignitors 130 ignite the combustible mixture discharged through the slots 104 of the V-shaped lengths of metal tubing 102.

Referring specifically to FIG. 2, safe operation of the oven 20 requires constant surveillance to insure that each of the ribbon burners 100 is ignited. This function is provided by flame sensors 134 mounted in the walls 28 of the enclosure 24. The flame sensors 134 comprise optical devices that are focused on the ends of the slots 104 of the lengths of V-shaped metal tubing 102 remote from the ignitors 130. The flame sensors 134 normally provide an electrical signal indicative of the presence of flame at the ends of the slots 104 remote from the inlet ends thereof.

Referring now to FIGS. 1 and 2, the air circulation and exhaust control system 22 of the oven 20 includes a pair of inlet plenums 140 each having an outer inlet aperture 142 and an inner inlet aperture 144. The inlet plenums 140 extend to a circulation fan 146 located inside the oven enclosure 24 which is driven by a motor 148 mounted on top of the top panel 30 of the enclosure 24 and, therefore, outside the oven interior 32. The circulation fan 146 draws heated gases into the inlet plenums 140 through the inlet apertures 142 and 144 thereof and discharges the heated gases through outlet passages 150. The outlet passages 150 extend to outlet plenums 152 which in turn extend to discharge tubes 154. Each discharge tube 154 includes a relatively large diameter inner section 156 and a relatively small diameter outer section 158. Both the inner section 156 and the outer section 158 of the discharge tube 154 have a plurality of outlet apertures 160 formed therein.

The inner section 156 of each discharge tube is rotatably positionable relative to its respective outlet plenum 152 so that the direction of discharge of heated gases through the outlet apertures 160 in each inner section 156 is adjustable in accordance with the operating parameters of the particular oven installation. Likewise, the outer section 158 of each discharge tube 154 is rotatably positionable relative to the inner section 156 thereof, again to direct the discharge of heated gases therefrom as may be required by particular applications of the invention.

Referring to FIGS. 1 and 2, the conveyor 40 has a generally oval shape comprising relatively long, straight side portions and relatively curved end portions. The ribbon burners 100 are adjacent the relatively straight side portions of the tiers of the conveyor 40. Operating the ribbon burners 100 creates heated gases comprising both the products of combustion and air which has been heated by contact with and mixture into the products of combustion. These heated gases tend to flow upwardly within the oven interior 32 and therefore flow into the inlet apertures 142 and 144 of the inlet plenums 140 of the air circulation and exhaust control system 22.

The outlet plenums 152 of the air circulation and exhaust control system 22 are semi-cylindrical. The discharge tubes 154 extend radially outwardly from the outlet plenums 152 to points situated adjacent the relatively curved ends of the tiers of the conveyor 40. Thus, the air circulation and exhaust control system 22 functions in one aspect to withdraw heated gases from adjacent the relatively straight side portions of the conveyor 40 and to recirculate and discharge the heated gases in regions adjacent to the curved end portions of the conveyor 40.

FIG. 7 diagramatically illustrates the path of the dough receiving trays T through the oven 20 and the relationship of the moving dough receiving trays T to the ribbon burners 100 and the discharge tubes 154. A ribbon burner 100 underlies the inlet tier 46 of the conveyor 40. The first transfer portion 50 of the conveyor 40 directs the trays T to the interior, ascending spiral 42. Ribbon burners 100 underlie lower portions of the ascending spiral 42. Both discharge tubes 154 and ribbon burners 100 underlie the upper portions of the ascending spiral 42. Thus, heating of the food products carried by the dough receiving trays from the underside thereof is concentrated when the trays T are traveling upwardly on the ascending spiral 42 and particularly when the trays are traveling on the upper portions of the ascending spiral 42.

Having reached the top of the interior, ascending spiral 42, the trays T travel across the second transfer portion 54 to the exterior, descending spiral 44 of the conveyor 40. As the dough receiving trays T and the food products contained therein travel downwardly on the descending spiral 44 of the conveyor 40, the trays pass under the discharge tubes 154 and over the ribbon burners 100. The positioning of the discharge tubes 154 above the trays T and the products carried therein on the descending spiral 44 of the conveyor 40 is an important feature of the invention.

Initially, the dough is wet and tender. It is important to heat the dough and cause it to lose water before putting a crust on the dough. The discharge tubes 154 are therefore placed beneath the interior, ascending spiral 42 of the conveyor 40. The concentration of discharge tubes 154 and ribbon burners 100 is greater around the inside loop than around the outside loop to assist in driving water out of the dough and toughening the dough. On the exterior, descending spiral 44, the discharge tubes 154 are above the dough receiving trays T to assist in building a crust and browning the dough products. It will be understood, however, that the direction of discharge of heated gases from the tubes 154 depends upon the nature of the food products being prepared in the oven.

Referring now to FIGS. 1 and 6, the flow of the hot gases within the oven interior 32 is shown. The heated gases caused by operation of the ribbon burners 100 flow into the inlet apertures 142 and 144 and into the inlet plenums 140 as shown by the arrows 170. The gases flow out of the discharge tubes 154 as shown by the arrows 172.

In FIG. 1 the flow from the orifices 160 is shown as directed horizontally downwardly onto the exterior, descending spiral 44 and vertically upwardly toward the bottom of the interior, ascending spiral 42 of the conveyor 40. In actual practice, the orifices 160 of the relatively large diameter inner sections 156 and the relatively small diameter outer sections 158 of each of the discharge tubes 154 are positioned to eliminate local "hot spots" and "cold spots" found in each individual oven made according to the present invention. For instance, the heated gases from the outlet apertures 160 in certain of the discharge tubes 154 may be directed toward the back of the dough receiving trays to adjust for the speed of the conveyor and eliminate cold spots.

The direction of the flow of gases through the outlet apertures 160 of the discharges tubes 154 is critical to successful operation of the present invention. As those of skill in the art know, different conveyor speeds, different gas and air flow rates, different oven temperatures and different types of dough and product, for instance, fermentation dough versus continuous dough, dough sprayed with water, seeds on top of the dough, etc., all affect the baking of the product in any given oven. Therefore, the rotational positioning of the outlet apertures 160 as indicated by the arrows 172 must be individually adjusted by a skilled oven operator for each of the discharge tubes 154 in each oven and for each product produced in the oven.

Referring now to FIGS. 2 and 8, a pair of discharge ports 180 are formed in the top panel 30 of the enclosure 24 of the oven 20. A pair of conduits 182 each extend from one of the discharge ports 180 to an exhaust blower assembly 184. The exhaust blower assemblies 184 withdraw heated gases from the oven interior 32 and discharge the heated gases into the atmosphere through stacks 186.

As is best shown in FIG. 9, each blower assembly 184 includes a blower shaft 190 having a sprocket 192 secured thereto. A timing belt 194 drivingly connects the sprocket 192 with a sprocket 196 which in turn drives a speed switch 198 and a tachometer 200. The tachometer 200 provides the computer 129 with an electrical output analogous to the rotational speed of a blower shaft 190, and the speed switch 198 functions as a governor to prevent operation of the ribbon burners 100 until the blower assembly 184 is operating at a sufficiently high rotational speed.

In accordance with the present invention, the rate of flow of combustion air into the manifold 120 is continuously monitored by the air flow indicator 123 and the flow rate is provided to the computer 129. The flow rate of the gaseous fuel is proportional to the flow rate of the combustion air and is determined by the setting of the mixing valves 128. The computer 129 compares the combined flow rate with the exhaust flow rate as indicated by the tachometer 200. The computer 129 then adjusts the speed of each exhaust blower assembly 184 so that the operational speed of each exhaust blower assembly 184 is maintained at a level that results in an exhaust flow rate that is roughly 7% above the combined flow rate of the combustion air and the gaseous fuel into the oven interior 32. Thus, a slight negative pressure is maintained at the doors 48 and 60 through which the trays T enter and leave the oven interior 32.

Figure 11:
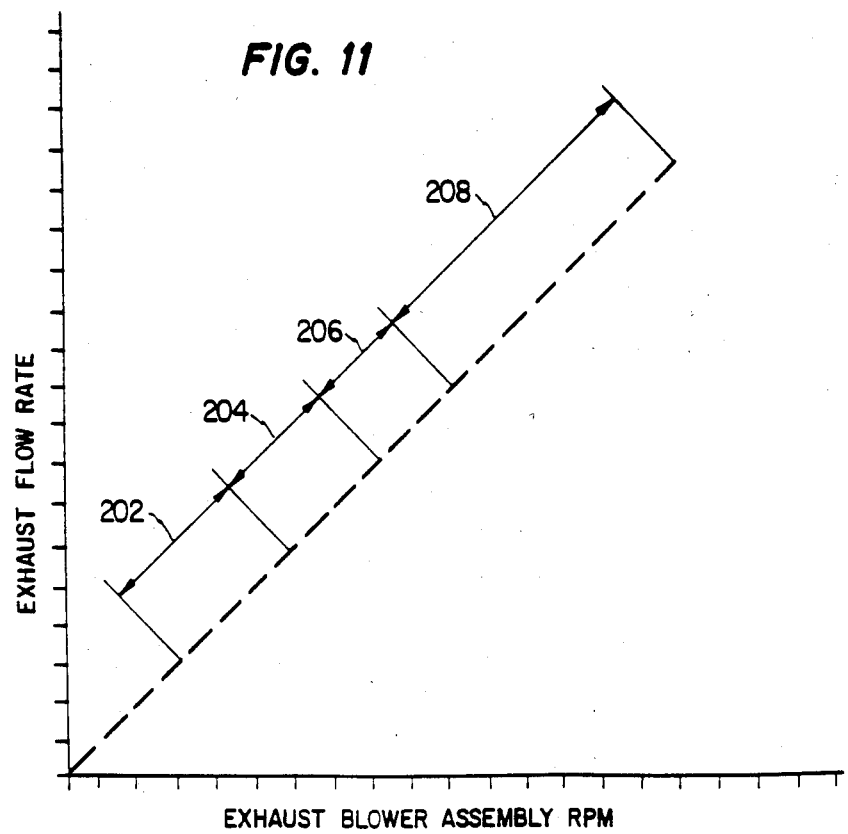
FIG. 11 is a chart schematically illustrating the operation of the exhaust fans of the oven of FIG. 1.

As is shown in FIG. 11, the exhaust blower assembly 184 of the air circulation and exhaust control system 22 has several operational ranges. These include a standby range 202, a baking range 204, a reserve range 206 and a purge range 208. The standby range 202 is used when the oven is in a heated condition but no food products are being transported therethrough by the conveyor 40. The baking range 204 is the normal operational range of the exhaust blower assembly 184 when the oven 20 processes food products that are transported therethrough on the trays T by the conveyor 40. The reserve range 206 is normally not used, but is provided for those circumstances in which the operational conditions of the oven dictate a greater exhaust flow rate than is normally required. The purge range 208 is used to remove all heated gases from the interior of the oven, for example, during emergency conditions, or when it is necessary to prepare the oven for maintenance, etc.

Figure 10:
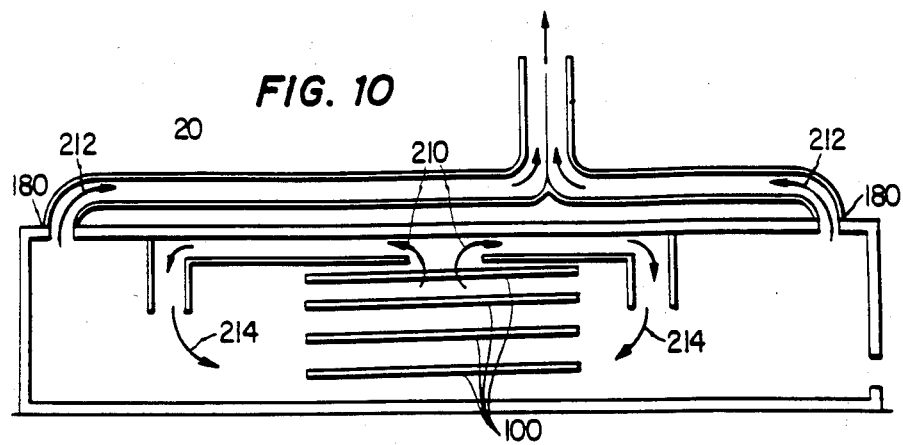
FIG. 10 is a diagramatic longitudinal sectional view of the oven of FIG. 1 illustrating the flow of exhaust gases therefrom.

The relationship between the recirculation components and the exhaust control components of the air circulation and exhaust control system 22 of the oven 20 is further illustrated by reference to FIG. 10. Under the minimum operating conditions of the oven 20, the combined flow rate of combustion air and gaseous fuel into the ribbon burners 100 is 360 cubic feet per minute. The flow rate of heated gases through the inlet plenums 140, the outlet passages 150, the outlet plenums 152, and the discharge tubes 154 under the action of the circulation fan 146 as indicated by the arrows 210 is 2400 cubic feet per minute. The flow rate of gases out of the oven through the discharge ports 180 as indicated by the arrows 212 is 390 cubic feet per minute. The rate of flow of gases returned to the burner area as indicated by the arrows 214 is 2010 cubic feet per minute. The flow rate of air through the doors 48 and 60, which also flows to the burner area is 30 cubic feet per minute.

When the oven is operated under standby conditions, that is, when the oven is heated but no food products are being transported therethrough on the trays T under the action of conveyor 40, the combined flow rate of combustion air and gaseous fuel into the ribbon burners 100 is 600 cubic feet per minute. The recirculation rate as indicated by the arrows 210 is 2400 cubic feet per minute, the exhaust flow rate as indicated by the arrows 212 is 640 cubic feet per minute and the rate of return of gases to the burner area as indicated by the arrows 214 is 1760 cubic feet per minute. The rate of flow of air through the doors 48 and 60 is 40 cubic feet per minute.

When the oven 20 is operated in the baking condition, the combined flow rate of combustion air and gaseous fuel into the ribbon burners 100 is 920 cubic feet per minute, the recirculation rate as indicated by the arrows 210 is 2400 cubic feet per minute, the exhaust flow rate as indicated by the arrows 212 is 990 cubic feet per minute and the rate of flow of gases back to the burner area as indicated by the arrows 214 is 1410 cubic feet per minute. The rate of flow of air through the doors 48 and 60 is 70 cubic feet per minute.

When the oven 20 is operated under maximum heating conditions, the combined flow rate of combustion air and gaseous fuel into the ribbon burners 100 is 1065 cubic feet per minute, the recirculation rate as indicated by the arrows 210 is 2400 cubic feet per minute, and the exhaust flow rate as indicated by the arrows 212 is 1140 cubic feet per minute. Under such conditions, gases are returned to the burner area as indicated by the arrows 214 at the rate of 1260 cubic feet per minute, and the rate of air flow through the doors 48 and 60 is 75 cubic feet per minute.

When the oven 20 is operated under purging conditions, that is, when it is desired to completely exhaust heated gases from the oven interior 32, the ribbon burners 100 are not operated and neither combustion air nor gaseous fuel is admitted thereto. The recirculation rate as indicated by the arrows 210 is 2400 cubic feet per minute, and the exhaust flow rate as indicated by the arrows 212 is 3800 cubic feet per minute. Under such conditions, heated gases are withdrawn from the burner area in the direction opposite that indicated by the arrows 214 at a rate of 1400 cubic feet per minute. The rate of air flow into the oven interior is 3800 cubic feet per minute.

Referring now to FIG. 12, an oven 220 comprising a second embodiment of the invention is illustrated therein. The oven 220 incorporates numerous component parts which are substantially identical in function and construction to component parts of the oven 20 as illustrated in FIGS. 1-11 and described above. Such identical component parts are designated in FIG. 12 with the same reference numerals utilized to designate the component parts of the oven 20, but are differentiated therefrom by means of a prime (') designation. The oven 220 differs from the oven 20 comprising the first embodiment of the invention primarily in the fact that it incorporates dual inlet plenums 222 and 224 and dual circulation fans 226 and 228 leading to the outlet passages 150', the outlet plenums 152' and the discharge tubes 154'. This allows control of the circulation rate of heated gases to the opposite ends of the oven interior 32' by regulating the operational speeds of the circulation fans 226 and 228 rather than the use of dampers as might otherwise be required in those embodiments of the invention employing a single circulation fan.

Although preferred embodiments of the invention have been illustrated in the accompanying drawings and described in the foregoing Detailed Description, it will be understood that the invention is capable of numerous rearrangements, modifications and substitutions of parts and elements without departing from the spirit of the invention.

We claim:

1. An exhaust flow control system for an oven comprising:
   means forming an oven enclosure defining an oven interior;

burner means situated within the oven for receiving combustion air and gaseous fuel and for burning the combustion air and the gaseous fuel to generate heated gases for heating the oven interior;

means for generating an electrical signal representing the combined rate of flow of combustion air and gaseous fuel into the burner means;

discharge port means for directing exhaust gases out of the oven interior;

exhaust blower means for controlling the rate of flow of exhaust gases out of the interior through the discharge port means; and means responsive to the electrical signal representing said combined rate of flow of combustion air and gaseous fuel into the burner means of controlling the speed of the exhaust blower means to withdraw exhaust gases from the oven interior through the discharge port at a predetermined rate proportional to the rate of flow of combustion air and gaseous fuel into the burner means so as to control the pressure within said oven interior.

2. The air circulation and exhaust control system of claim 1 further comprising a conveyor means in said oven having a generally oval shape with relatively elongated sides and relatively curved ends.

3. The air circulation and exhaust control system of claim 2 further comprising means for supporting the burner means adjacent portions of the relatively elongated sides, and discharge tube means for receiving the heated gas from above said burner means and discharging said heated gas at points adjacent the relatively curved portions of the ends of the conveyor for heating the area of said curved end portions.

4. The air circulation and exhaust control system of claim 3 further comprising:

dual inlet plenums having gas receiving inlet ports and extending to dual inlet apertures situated above and in juxtaposed relationship with the burner means for receiving heated gases generated by operation of the burner means;

dual circulation fan means for drawing heated gases into the dual inlet plenums through the inlet ports thereof; and dual conduit means coupled to said dual inlet plenums for directing the heated gases to the discharge tube means to effect heating of the food products in the curved end portion area of said conveyor.

* * * * *